(12) United States Patent
Cuenod et al.

(10) Patent No.: US 7,174,464 B1
(45) Date of Patent: *Feb. 6, 2007

(54) METHOD OF MAKING A USER PIECE OF SOFTWARE SECURE BY MEANS OF A PROCESSING AND SECRET MEMORIZING UNIT, AND A SYSTEM CONSTITUTING AN APPLICATION THEREOF

(75) Inventors: Jean-Christophe Cuenod, Montesson (FR); Gilles Sgro, Bourg de Peage (FR)

(73) Assignee: Validy, Romans sur Isere (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/959,419

(22) PCT Filed: Apr. 27, 2000

(86) PCT No.: PCT/FR00/01121

§ 371 (c)(1),
(2), (4) Date: Oct. 26, 2001

(87) PCT Pub. No.: WO00/67094

PCT Pub. Date: Nov. 9, 2000

(30) Foreign Application Priority Data

Apr. 28, 1999 (FR) .................................. 99 05570

(51) Int. Cl.
*G06F 11/30* (2006.01)
*G06F 12/14* (2006.01)
*H04L 9/32* (2006.01)
*B23Q 15/00* (2006.01)
*G08B 13/00* (2006.01)

(52) U.S. Cl. ...................... 713/187; 226/26; 726/34

(58) Field of Classification Search ................ 713/187; 726/26, 34

See application file for complete search history.

(56) References Cited

U.S. PATENT DOCUMENTS 4,757,534 A * 7/1988 Matyas et al. ................ 705/56

FOREIGN PATENT DOCUMENTS

| EP | 0 191 162 A2 | 8/1986 |
| EP | 0 768 601 A1 | 4/1997 |
| EP | 0 795 809 A2 | 9/1997 |
| WO | WO 00/67094 | 11/2000 |

OTHER PUBLICATIONS

"DEA-Bases Pseudorandom Number Generator" IBM Technical Disclosure Bulleting, US, IBM Corp. New York, vol. 35, No. 1B, Jun. 6, 1992, pp. 431-434.

* cited by examiner

*Primary Examiner*—Ayaz Sheikh
*Assistant Examiner*—Trang Doan
(74) *Attorney, Agent, or Firm*—Sughrue Mion, PLLC

(57) ABSTRACT

The invention provides a method of making a user piece of software secure by means of a user processing and memorizing unit ($11_u$) containing at least one user secret ($S_u$).

According to the invention, the method consists in:
  making a user piece of software and modified data (D') available to a user; and
  in a stage of running the user piece of software with the associated modified data (D'), enabling the user possessing the user unit ($11_u$) to recover the original data (D) from the modified data (D').

11 Claims, 3 Drawing Sheets

METHOD OF MAKING A USER PIECE OF SOFTWARE SECURE BY MEANS OF A PROCESSING AND SECRET MEMORIZING UNIT, AND A SYSTEM CONSTITUTING AN APPLICATION THEREOF

TECHNICAL FIELD

The present invention relates to the technical field of data processing systems in the broad sense and more particularly, it relates to means for making secure the use of a program or piece of software operating on said data processing systems.

More particularly, the subject matter of the invention relates to means for making a user piece of software secure by means of a processing and secret memorizing unit, commonly referred to as a "smart card".

PRIOR ART

In the above technical field, the main drawback relates to unauthorized use of a piece of software by users who have not paid a license fee. Such illegal use of a piece of software is clearly detrimental for publishers and distributors of software. To avoid such illegal copies, various solutions for protecting a piece of software have been proposed in the state of the art. Thus, one known solution consists in making use of a hardware protection system, such as a physical element known as a protective key or "dongle". Such a protective key is intended to guarantee to the publisher of the piece of software that the piece of software is executed solely when in the presence of the key.

Unfortunately, it has been found that that solution is ineffective since it suffers from the drawback of being easily overcome. By using specialized tools such as disassemblers, a dishonest user or "pirate" can remove the dongle-checking instructions. It then becomes possible to make illegal copies corresponding to versions of the piece of software that have been modified so that they no longer have any protection. In addition, that solution cannot be generalized to all software insofar as it is difficult to connect more than two such protective keys on the same machine.

Patent application No. EP 0 191 162 describes a method for encrypting a piece of software so as to avoid unauthorized use. Such a method consists in encrypting the program by means of a unique key, in storing the encrypted program on a medium for distribution purposes, and in executing the program on a computer having protected memory and protected cryptographic means including a secret key that is unique for that computer. The method consists in providing the user of the program with a unique secret password that depends on the key of the program and on the key of the computer so that the computer can decrypt and execute the program in its protected memory. In a second implementation, a smart card possessing a unique key can be associated with the computer so that under such circumstances the unique secret password supplied to the user depends on the key of the program and on the key of the smart card.

The major drawback of that method is the need to use a computer having protected memory in order to run the program. Standard computers do not have protected memory, thus considerably limiting the popularity of that method.

Another drawback is that implementing it requires the user to apply to a password distribution center for the password that corresponds to the program and that depends on the user's computer or smart card.

Another drawback of that method is that it needs as many secrets as there are smart cards and it requires the password distribution center to manage all of those secrets.

SUMMARY OF THE INVENTION

The invention seeks to remedy the drawbacks of the prior art by proposing a method for making a user piece of software secure by means of a processing and secret memorizing unit, which method is designed for implementation on a standard computer and does not require the user to make any application to a password distribution center.

To achieve such an object, the method of the invention seeks to make a user piece of software secure from a reconstitution processing and memorizing unit including at least one reconstitution secret, said piece of software operating on an application data processing system.

According to the invention, the method consists:

in a stage of generating modified data:
    and in a substage of creating data, in using a generation piece of software to establish "original" data associated with the user piece of software;
    and in a modification substage, in using a generation secret and at least a portion of the associated original data to determine modified data;

in a stage of making available, distributing the user piece of software and the associated modified data to a user; and in a stage of using the user piece of software together with the associated modified data on a user system, and in a substage of reconstituting the original data;

for a user possessing a reconstitution unit including a reconstitution secret in:
    selecting an input parameter constituted by at least a portion of the modified data;
    transferring the input parameter from the user system to the reconstitution unit;
    enabling the reconstitution unit to determine at least one output parameter on the basis of the reconstitution secret and the input parameter;
    transferring the output parameter from the reconstitution unit to the user system; and
    running at least one reconstitution function making use of at least a portion of the output parameter to obtain the original data; and for a user not possessing the reconstitution unit, in allowing the user piece of software to be used at best with the modified data.

The method of the invention thus makes it possible for a user piece of software to be made secure by implementing a reconstitution processing and secret memorizing unit, which method presents the feature of keeping the information confidential even after the secret has been used on several occasions. It can thus be seen that any derivative version of the piece of software attempting to operate without said specific unit is incapable of making use of data produced by a generation piece of software insofar as the reconstitution secret contained in the reconstitution processing and memorizing unit is out of reach. The use of a generation secret makes it possible to modify the data storage format in a manner that is not predictable so that the use of modified data cannot achieve proper operation of the piece of software unless the user possesses the reconstitution secret. The subject matter of the invention is particularly advantageous for use with piece of software associated with frequent distribution of libraries in the general sense, having content that constitutes data in need of protection, such as encyclopedias or games, for example.

Various other characteristics appear from the following description made with reference to the accompanying drawings which show implementations of the invention as non-limiting examples.

BEST METHOD OF PERFORMING THE INVENTION

The method of the invention comprises a first step or stage for generating modified data during which modified data is generated from original data that is to be protected and that is associated with a user piece of software. The method of the invention further comprises a second step or stage of making the piece of software and the associated modified data available to a user, and a third step or stage of use during which the user piece of software is used together with the associated modified data.

Figure 1:
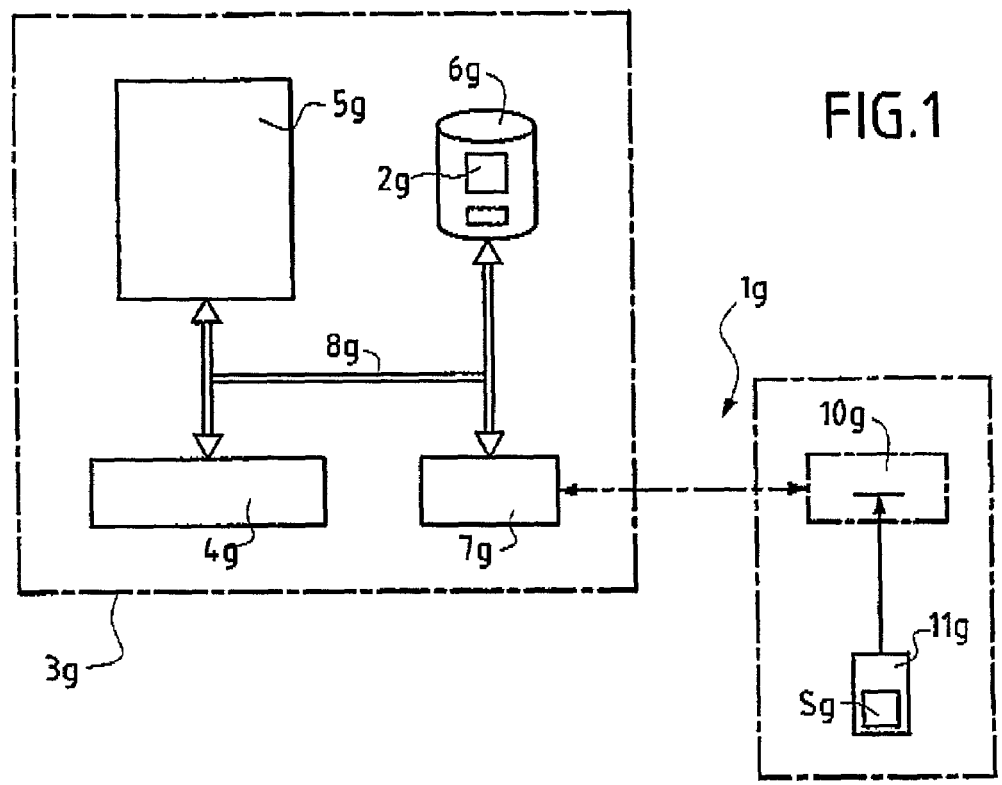
FIG. 1 is a diagram of hardware enabling the invention to be implemented during a first stage, i.e. a stage of generating modified data.

FIG. 1 shows generation apparatus $1_g$ for implementing the stage of generating modified data in the method of the invention. This generation apparatus $1_g$ is adapted to make use of a generation piece of software $2_g$ for generating modified data and whose function is described more clearly below. In the embodiment shown, the generation apparatus $1_g$ comprises a "generation" data processing system $3_g$ of any conventional type, referred to as the generation system $3_g$ in the description below. In the example described, the generation system $3_g$ comprises a computer, but it must be understood that such a generation system $3_g$ could form an integral portion of a variety of kinds of apparatus in the broad sense. In the example described, the generation system $3_g$ comprises at least one processor $4_g$, at least one working memory $5_g$, at least one data storage medium $6_g$, and at least one input/output interface circuit $7_g$. Conventionally, the various components of the generation system $3_g$ are interconnected by means of a communication bus $8_g$.

In a first variant embodiment, the interface circuit $7_g$ is connected to a reader $10_g$ for reading a "generation" processing and memorizing unit $11_g$ that contains at least one generation secret $S_g$. In this example, the generation unit $11_g$ is designed to be written to or read by the reader $10_g$, but it must be understood that such a generation unit $11_g$ could be in the form of any type of hardware key, connected to an input/output circuit, directly to the communication bus $8_g$, or any communication means such as a wireless link, for example. In general, the generation unit $11_g$ contains at least one generation secret $S_g$ or one device for storing encoded information, at least algorithmic means for processing data, and at least a system for exchanging data between the generation unit $11_g$ and the generation system $3_g$. Conventionally, the generation unit $11_g$ is implemented as a smart card.

In a second embodiment, the generation secret $S_g$ is a parameter of the generation piece of software $2_g$.

Such generation apparatus $1_g$ enables a data creation substage to be performed. During this substage, it is established for the user piece of software $2_u$, associated "original" data D. The original data D is to be associated with the user piece of software $2_u$ when the piece of software is in use, and it constitutes data that needs to be protected because of its economic value. By way of example, the original data D can constitute a library associated with an encyclopedia software or game scenes associated with a gaming software.

On the basis of at least a portion of the original data D, the method implements a modification substage of computing modified data D' by using a generation secret $S_g$. Both the original and modified versions of the data D and D' are obtained by means of a generation piece of software $2_g$ in the broad sense. In a first variant, the generation secret $S_g$ can be included in a generation processing and memorizing unit $11_g$. When the generation secret $S_g$ is not known, the use of such a generation unit $11_g$ makes it difficult or even impossible to deduce the modified data D' from the original data D, even for the person who generated the modified data associated with the piece of software. In a second variant, the generation secret $S_g$ can be associated directly with the generation piece of software $2_g$, so that it remains secret except for the software developer(s).

This stage of generating modified data is followed by a stage of making it available, in which the modified data D' is supplied to users in association with user piece of software $2_u$. Thus, at the end of the data generation stage, the user piece of software $2_u$ is made available to at least one user together with modified data D' as obtained from a generation secret $S_g$ and at least a portion of the original data D associated with the user piece of software $2_u$.

Such user piece of software together with its modified data D' can then be used by at least one user during a utilization or "use" stage. This use stage comprises a "functional" substage during which the user makes use of the functionalities of the piece of software, and a substage of reconstituting original data D. During the reconstitution substage, each user provided with a reconstitution secret associated with the user piece of software $2_u$ can perform the inverse modification, i.e. can decode the modified data D' so as to recover and then use the original data D. It should be understood that the modified data D' is translated back by the user piece of software $2_u$ in order to recover or reconstitute the original data D when the reconstitution secret $S_u$ is present.

Figure 2:
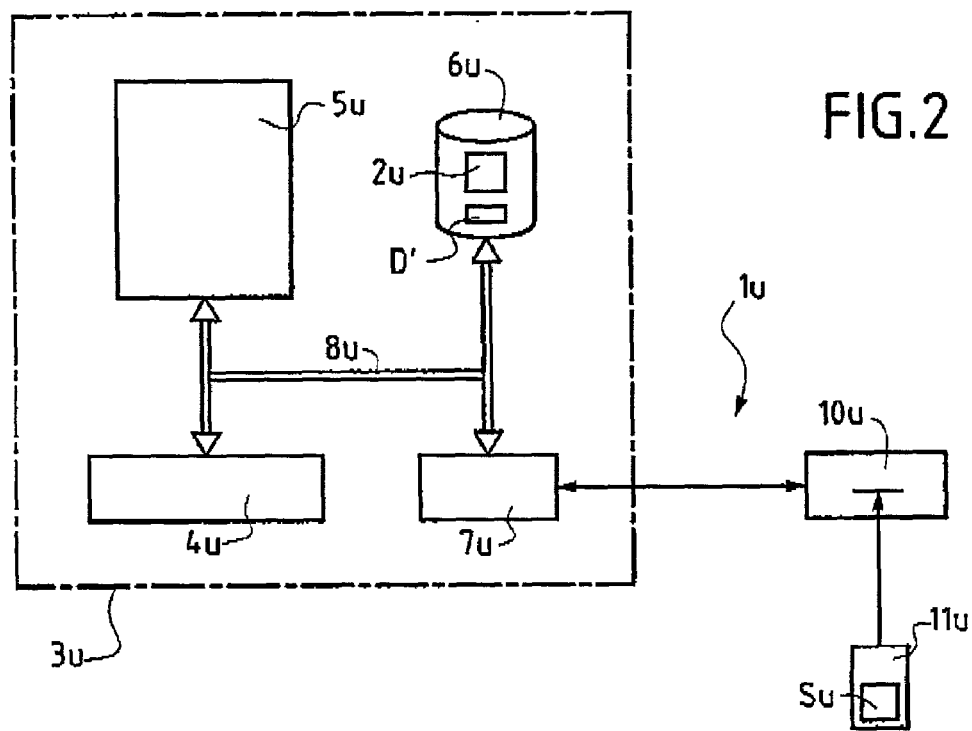
FIG. 2 is a diagram showing hardware enabling the invention to be implemented during a third stage, i.e. the usage of the user piece of software together with its modified data.

FIG. 2 shows user apparatus $1_u$ enabling the third stage of the method of the invention to be implemented. In the implementation shown, the user device $1_u$ comprises a user data processing system $3_u$ of any conventional type, referred to as the user system $3_u$ in the description below. In this example, the user system $3_u$ constitutes a computer, but it must be understood that such a user system $3_u$ could form an integral portion of various machines, devices, or vehicles in the broad sense. In the present example, the user system $3_u$ comprises at least one processor $4_u$, at least one working memory $5_u$, at least one data storage medium $6_u$, and at least one input/output interface circuit $7_u$. Conventionally, the various components of the user system $3_u$ are interconnected by means of a communication bus $8_u$. The interface circuit $7_u$ is connected to a reader $10_u$ for reading a reconstitution processing and memorizing unit $11_u$ that contains at least one reconstitution secret $S_u$. In the example shown, this reconstitution processing and memorizing unit $11_u$, referred to as the reconstitution unit $11_u$ in the description below, is designed to be written to or read from by the reader $10_u$, but it must be understood that such a reconstitution unit $11_u$ can be implemented in the form of any type of hardware key connected to an input/output circuit, directly to the communication bus $8_u$, or via or any other communication means, such as a wireless link, for example. In general, the reconstitution unit $11_u$ contains at least one reconstitution secret $S_u$ or one device for storing encoded information, at least algorithmic data processing means, and at least a system for exchanging data between the reconstitution unit $11_u$ and the user system $3_u$. Conventionally, the reconstitution unit $11_u$ is implemented as a smart card.

Figure 3:
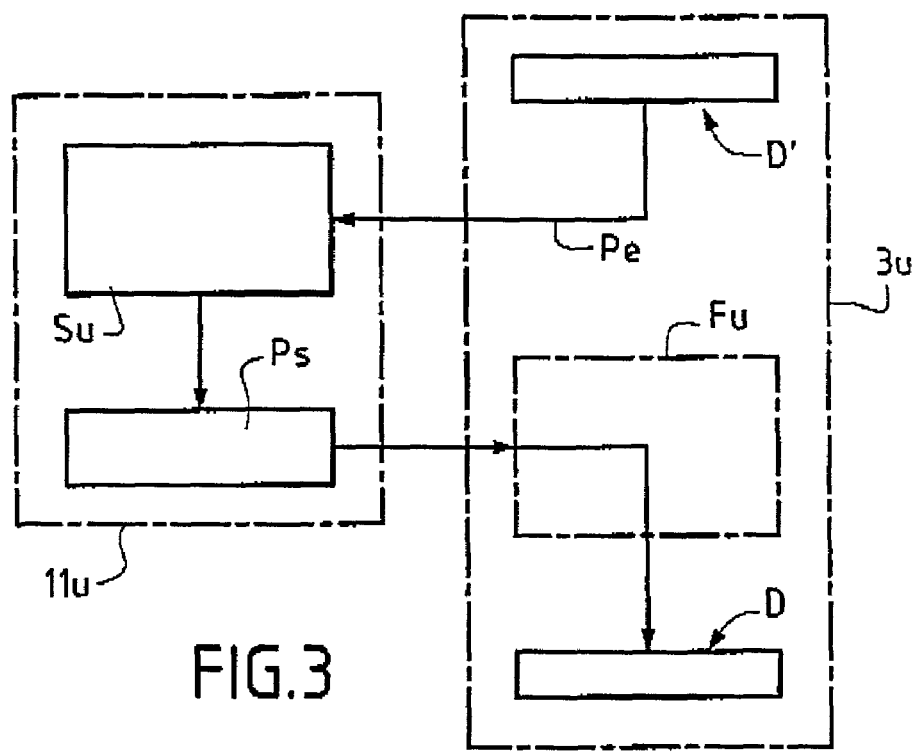
FIGS. 3 to 6 are block diagrams explaining how modified data is used in association with a piece of software, in various implementations.

FIG. 3 shows a first variant implementation of the method of the invention enabling the modified data D' to be translated back again so as to recover or reconstitute the original data D, by implementing the user apparatus $1_u$. The method consists in selecting at least one input parameter $P_e$ for the reconstitution unit $11_u$. This input parameter $P_e$ is constituted by at least a portion of the modified data D'. The input parameter $P_e$ is transferred from the user system $3_u$ to the reconstitution unit $11_u$. The reconstitution unit $11_u$ determines at least one output parameter $P_s$ on the basis of at least one reconstitution secret $S_u$ and the input parameter $P_e$.

It should be observed that the reconstitution secret $S_u$ can be constituted either by at least one secret function which generates the output parameter $P_s$ from the input parameter $P_e$, or by at least one piece of secret information together with at least one optionally known conversion function enabling the output parameter $P_s$ to be derived from the input parameter $P_e$ and the secret information. When the reconstitution secret is not known, the use the reconstitution unit $11_u$ makes it difficult or even impossible to deduce the output parameter $P_s$ from the input parameter $P_e$.

Thereafter, the reconstitution unit $11_u$ transfers the output parameter $P_s$ to the user system $3_u$. Such a user system $3_u$ performs at least one reconstitution function $F_u$ which uses at least a portion of the output parameter $P_s$ to obtain the original data D.

In a preferred example of the variant shown in FIG. 3, the input parameter $P_e$ is equal to the modified data D', while the output parameter $P_s$ is equal to the reconstituted original data D. During the stage of generating the modified data, the generation secret $S_g$ performs a transformation function that is the inverse of the reconstitution secret $S_u$, i.e. its input parameter is equal to the original data D, while the output parameter from the generation unit is equal to the modified data D'.

It can thus be seen that a holder of a reconstitution unit $11_u$ associated with a particular user piece of software $2_u$ can recover and use the original data D associated with said piece of software. Using the user piece of software $2_u$ in the presence of the specific reconstitution unit $11_u$ makes it possible to translate the modified data D' associated with said piece of software $2_u$ so as to obtain the original data D. However, a user who does not possess the reconstitution unit $11_u$ corresponding to the user piece of software $2_u$ can use said piece of software, but only without the original data D, or at best with the modified data D'.

Furthermore, the method of the invention is genuinely effective even if its reconstitution function $F_u$ is known and if the input and output parameters $P_e$ and $P_s$ can be observed and modified by a dishonest person, providing the reconstitution secret $S_u$ is itself kept secret. A dishonest person will not be capable of discovering how data D' is to be modified to obtain data D without help from the reconstitution unit $11_u$.

A dishonest person might attempt to modify the user piece of software $2_u$ so that it no longer needs the corresponding reconstitution unit $11_u$. To do this, it must begin by having the specific reconstitution unit $11_u$ available. Thereafter, the dishonest person must list all of the modified data D' in order either to draw up a correspondence table between all of the input parameters $P_e$ and the output parameters $P_s$ and then generate a pseudo-simulator of the reconstitution unit $11_u$, or else reconstitute all of the original data D and then set out to distribute a new user piece of software $2'_u$, including the reconstituted original data instead of the modified data, thus making it possible to omit the stage of reconstituting or translating the modified data in the reverse direction. However such a task is difficult because of the large quantity of original data.

In the embodiment shown in FIG. 3, the modified data D' is transferred in full to the reconstitution unit $11_u$. To increase the speed of such apparatus, FIGS. 4 to 6 describe preferred variants of the security method of the invention.

Figure 4:
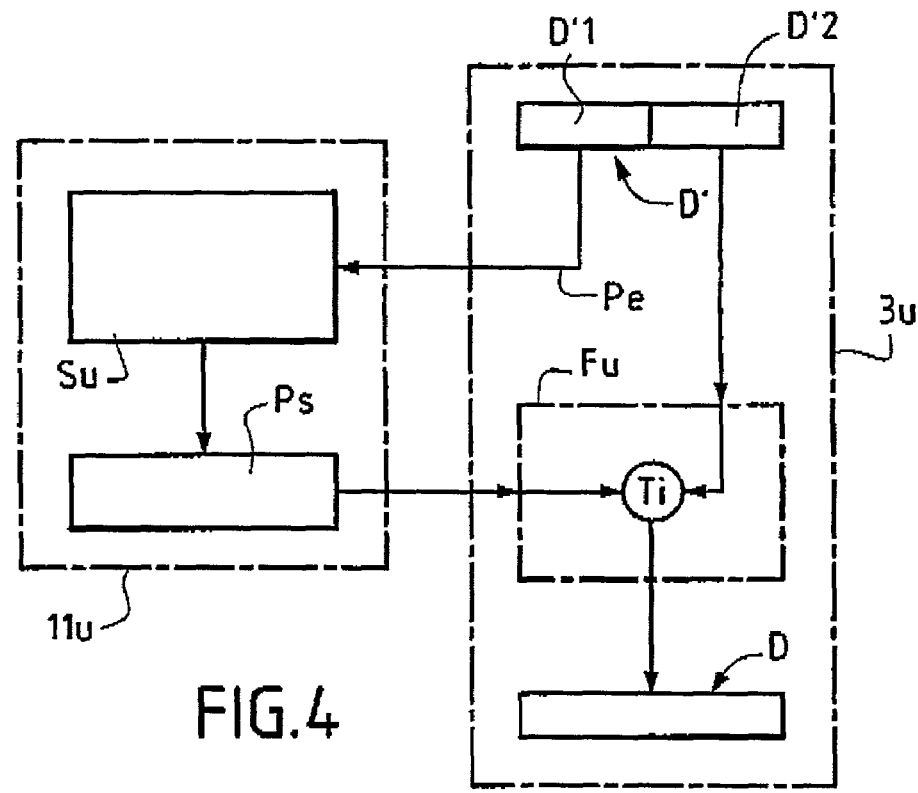

FIG. 4 shows a second variant of the stage in which the user piece of software $2_u$ is used with the modified data. In this example, the modified data D' is split up into at least a first portion $D'_1$ and a second portion $D'_2$. At least the first portion $D'_1$ of the modified data is selected as the input parameter $P_e$. This input parameter $P_e$ is transferred to the reconstitution unit $11_u$ which, with the help of the reconstitution secret $S_u$, determines an output parameter $P_s$. The reconstitution unit $11_u$ transfers the output parameter $P_s$ to the user system $3_u$. The user system $3_u$ runs a reconstitution function $F_u$ which includes an inverse translation function $T_i$ which serves to recover or reconstitute the original data D on the basis of at least a part of the output parameter $P_s$ and the second portion $D'_2$ of the modified data D'.

In a preferred implementation of the variant shown in FIG. 4, the first portion and the second portion of the modified data D' are selected respectively to be a pseudo-random number as selected during the generation stage, and to be original data as modified during the generation stage and referred to as modified original data $D'_2$. The pseudo-random number is used as the input parameter $P_e$ and is transformed by the reconstitution secret $S_u$ to obtain the output parameter $P_s$. The inverse translation function $T_i$ takes the output parameter $P_s$ and the modified original data $D'_2$ and serves to obtain the original data D therefrom. In the stage of generating modified data that corresponds to this preferred implementation, a pseudo-random number is selected as an input parameter for the generation secret $S_g$ which delivers a generation output parameter. Such an output parameter is used to modify the original data D by means of a translation function T so as to obtain the modified original data. The modified original data in association with the pseudo-random number then constitutes the modified data D'. Naturally, the inverse translation function $T_i$ is constituted by the function which is the inverse of the translation function T or by a combination of equivalent individual functions.

In the variant shown in FIG. 4, the way in which the original data D is modified is entirely independent of said data D.

Figure 5:
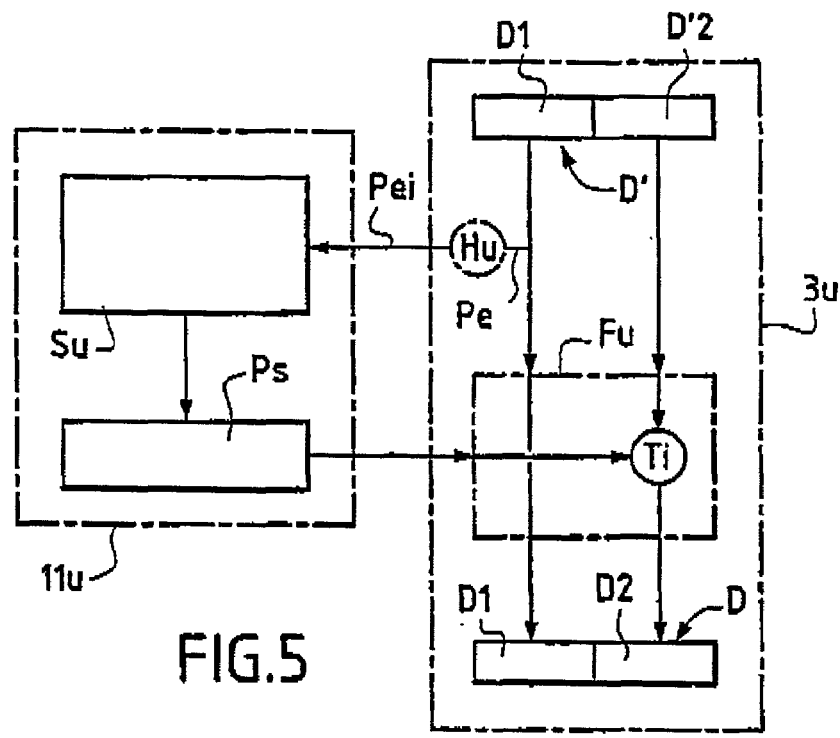

FIG. 5 shows a third variant for the stage of using the user piece of software $2_u$ with the modified data D'. In this variant the modified data D' is constituted by a first portion $D_1$ and by a second portion $D'_2$. At least a fraction of the first portion $D_1$ which corresponds to the input parameter $P_e$ is transferred to the reconstitution unit $11_u$ which determines an output parameter $P_s$ with the help of the reconstitution secret $S_u$. The output parameter $P_s$ is transferred to the user system $3_u$ which implements a reconstitution function $F_u$ including an inverse translation function $T_i$ which enables the original second portion $D_2$ of the data to be recovered or reconstituted by using at least part of the output parameter $P_s$ and the second portion $D'_2$ of the data. The reconstitution function $F_u$ also delivers the first portion $D_1$ of the original data which, when associated with the second portion $D_2$, makes up the original data D.

In a preferred implementation of the FIG. 5 variant, the first portion $D_1$ corresponds to a portion of the original data, while the second portion $D'_2$ corresponds to the other portion of the original data which was modified during the generation stage and which is referred to as the modified second portion $D'_2$ of the data. The first portion $D_1$ of the original data is transformed by the reconstitution secret $S_u$ in order to obtain the output parameter $P_s$. The reconstitution function $F_u$ also includes an inverse translation function $T_i$ which serves to recover the second portion $D_2$ of the original data from the output parameter $P_s$ and the modified second portion $D'_2$ of the data. In addition, the reconstitution function $F_u$ is also adapted to deliver the first portion $D_1$ of the original data which, in combination with the second portion $D_2$ of the original data serves to make up the original data D. In the generation stage corresponding to this preferred embodiment, the original data D is divided into a first portion $D_1$ and a second portion $D_2$. At least a part of the first portion $D_1$ is used as the input parameter for the generation secret $S_g$ which delivers a generation output parameter. At least a part of the generation output parameter is used by a translation function forming a portion of the generation function to translate the second portion $D_2$ of the original data in order to obtain a modified second portion $D'_2$ of the data. This modified second portion $D'_2$ of the data is associated with the first portion $D_1$ of the original data in order to make up the modified data D'.

In this variant, the way in which the original data D is modified depends solely on said data D.

Figure 6:
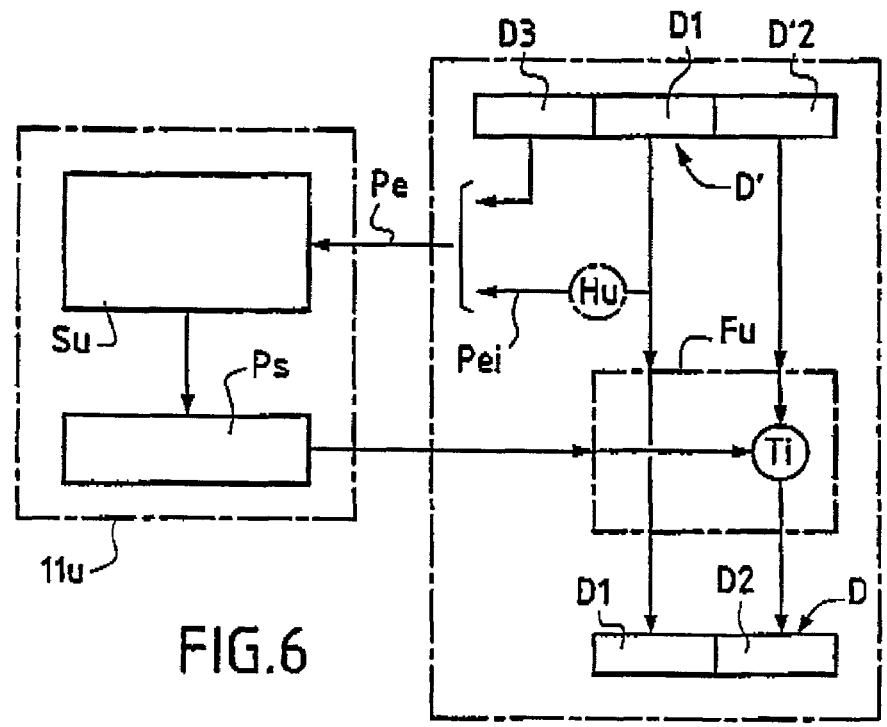

FIG. 6 shows a fourth variant implementation of the user piece of software $2_u$ using modified data D'. In this example, the modified data D' comprises a first portion $D_1$, a second portion $D'_2$, and a third portion $D_3$. The input parameter $P_e$ is constituted by at least a part of the first portion $D_1$ and a part of the third portion $D_3$. The input parameter $P_e$ is transferred to the reconstitution unit $11_u$ which determines an output parameter $P_s$ using a reconstitution secret $S_u$. The output parameter $P_s$ is transferred to the user system $3_u$ which implements a reconstitution function $F_u$ comprising an inverse translation function $T_i$ which enables the original second portion $P_2$ of the data to be recovered or reconstituted by using at least a part of the output parameter $P_s$ and the second portion $D'_2$ of the data. The reconstitution function $F_u$ also delivers the first portion $D_1$ of the original data which, when associated with the original second portion $D_2$ of the data makes up the original data D.

In a preferred embodiment of the FIG. 6 variant, the third portion $D_3$ corresponds to a pseudo-random number selected during the generation stage, while the first portion $D_1$ corresponds to a portion of the original data D, and the second portion $D'_2$ corresponds to the remainder of the original data after modification during the generation stage and referred to as the modified second portion $D'_2$ of the data. At least a part of the first portion $D_1$ of the original data and at least a part of the pseudo-random number together make up the input parameter $P_e$ which is transformed by the reconstitution secret $S_u$ to obtain the output parameter $P_s$. The reconstitution function $F_u$ also comprises an inverse translation function $T_i$ which serves to recover or reconstitute the second portion $D_2$ of the original data from the output parameter $P_s$ and the modified second portion $D'_2$ of the data. The reconstitution function $F_u$ is also adapted to deliver the first portion $D_1$ of the data which, when associated with the second portion $D_2$ of the original data, makes up the original data D. In the generation stage corresponding to this preferred implementation, the original data D is subdivided into first and second portions $D_1$ and $D_2$, and a pseudo-random number is selected to constitute the third portion $D_3$. At least a part of the first portion $D_1$ of the data and at least a part of the pseudo-random number are used as input parameters for the generation secret $S_g$ which delivers a generation output parameter. At least a part of the generation output parameter is used by a generation function to translate the second portion $D_2$ of the original data in order to obtain a modified second portion $D'_2$ of the data. The pseudo-random number $D_3$ and the first portion $D_1$ of the original data are associated with said modified second portion $D'_2$ so as to make up the modified data D'.

In this variant, the way in which the original data D is modified depends simultaneously on said data D itself and also on a pseudo-random number.

In a preferred variant associated with the examples described with reference to FIGS. 5 and 6, the first portion $D_1$ of the data for transfer to the reconstitution unit $11_u$ is processed so as to facilitate the processing operations performed by the reconstitution unit $11_u$. This portion $D_1$ of the data is thus delivered to the input of at least one intermediate user translation function $H_u$ such as a non-invertible function, e.g. of the "one-way hash" type so as to obtain at least one intermediate input parameter $P_{ei}$. This intermediate input parameter $P_{ei}$ as determined by the user system $3_u$ is optionally combined with the third portion $P_3$ to form the input parameter $P_e$. The input parameter $P_e$ is transferred to the reconstitution unit $11_u$ so that the reconstitution unit can determine the output parameter $P_s$ on the basis of the reconstitution secret $S_u$, the intermediate input parameter $P_{ei}$, and optionally the third portion $D_3$.

Naturally, during the stage of generating the modified data D', the generation system implements at least one generation intermediate translation function so as to obtain at least one generation intermediate input parameter.

In the examples shown in FIGS. 5 and 6, it can be seen that in use the original data D is obtained by means of a processing step implementing the reconstitution unit $11_u$. Naturally, provision can be made for this processing step to be repeated n times in order to increase the complexity with which data is coded. Thus, the following operations can be repeated as often as necessary, namely:

subdividing the previously obtained data into at least first and second portions;

determining at least one output parameter from a function of a portion of the data and one or more reconstitution secrets different from or identical to the previously used secret(s);

modifying at least one of the other portions of the data by means of a translation function identical to or different from the previously used function; and reconstituting data after each data processing stage.

In this implementation, during the modification substage, the data generation steps are performed in the reverse order, the same number n of times as the number of steps that are performed during the reconstitution substage.

In a preferred variant in accordance with FIGS. 5 and 6, the modified data D' is made up of at least two portions $D'_1$, $D'_2$, of substantially equivalent size. In a first processing step, the second portion $D'_2$ is used as an input parameter for the reconstitution unit $11_u$ in order to recover the first portion $D_1$ of the original data. After a first processing step, intermediate data is obtained that is constituted by at least the first portion $D_1$ of the original data and the modified second portion $D'_2$ of the data. In a second processing step, the roles of the portions $D_1$ and $D'_2$ are interchanged. Thus, at least the first portion $D_1$ of the data is used as an input parameter for the reconstitution unit $11_u$ while the modified second portion $D'_2$ of the original data is modified by a translation function in order to recover the second portion $D_2$ of the original data. It follows that all of the original data D is reconstituted after all of the modified data D' has been decoded. Naturally, during the modification substage, reverse operations are performed to encode or modify all of the original data D.

According to a preferred implementation characteristic of the invention, the modified data D' is written or recorded on the data storage medium $6_u$ which is associated with the user system $3_u$ to enable the modified data D' to be used when running the user piece of software $2_u$. Naturally, the data storage medium $6_u$ can be constituted in any known manner, for example as a hard disk, a magnetic tape, a CD-ROM, or any other storage device used for the purposes of storing or transmitting such data.

The method of the invention as described above can be implemented with a variety of reconstitution functions $F_u$ depending on the objectives of the publisher of the protected user piece of software. For example, the reconstitution function $F_u$ can include an encrypting function. Under such circumstances, the translated data will be manifestly incomprehensible. In another implementation, the reconstitution function $F_u$ can be a function that implements minor pseudorandom modification to the digits contained in the original data. This enables the user of pirated piece of software $2'_u$ to use the data that is associated with the original version of the piece of software, but that will lead to the pirated piece of software $2'_u$ operating erroneously.

The invention claimed is:

1. A method of making a user piece of software secure by means of a user processing and memorizing unit containing at least one reconstitution secret, said piece of software operating on a user data processing system, and the method comprising the following steps:
   (a) in a stage of generating modified data:
      (1) and in a substage of creating data, using a generation piece of software to establish original data associated with the user piece of software;
      (2) and in a modification substage, using a generation secret and at least a portion of the associated original data to determine modified data;
   (b) in a stage of distribution, distributing the user piece of software and the associated modified data to a user; and
   (c) in a stage of using the user piece of software together with the associated modified data on a user system, and in a substage of reconstituting the original data;
      (1) for a user possessing a reconstitution unit including a reconstitution secret:
         (i) subdividing the modified data into at least a first portion and a second portion;
         (ii) selecting the first portion of the modified data as an input parameter;
         (iii) transferring the input parameter from the user system to the reconstitution unit;
         (iv) enabling the reconstitution unit to determine at least one output parameter on the basis of the reconstitution secret and the input parameter;
         (v) transferring the output parameter from the reconstitution unit to the user system; and
         (vi) running at least one reconstitution function making use of at least a portion of the output parameter and the second portion of the modified data to obtain the original data; and
      (2) for a user not possessing the reconstitution unit, allowing the user piece of software to be used at best with the modified data.

2. A method of making a user piece of software secure by means of a user processing and memorizing unit containing at least one reconstitution secret, said piece of software operating on a user data processing system, and the method comprising the following steps:
   (a) in a stage of generating modified data:
      (1) and in a substage of creating data, using a generation piece of software to establish original data associated with the user piece of software;
      (2) and in a modification substage, using a generation secret and at least a portion of the associated original data to determine modified data;
   (b) in a stage of distribution, distributing the user piece of software and the associated modified data to a user; and
   (c) in a stage of using the user piece of software together with the associated modified data on a user system, and in a substage of reconstituting the original data;
      (1) for a user possessing a reconstitution unit including a reconstitution secret:
         (i) subdividing the modified data into at least a first portion and a second portion;
         (ii) selecting the first portion of the modified data as an input parameter;
         (iii) transferring the input parameter from the user system to the reconstitution unit;
         (iv) enabling the reconstitution unit to determine at least one output parameter on the basis of the reconstitution secret and the input parameter;
         (v) transferring the output parameter from the reconstitution unit to the user system; and
         (vi) running at least one reconstitution function making use of at least a portion of the output parameter and the first and the second portion of the modified data to obtain the original data; and
      (2) for a user not possessing the reconstitution unit, allowing the user piece of software to be used at best with the modified data.

3. A method of making a user piece of software secure by means of a user processing and memorizing unit containing at least one reconstitution secret, said piece of software operating on a user data processing system, and the method comprising the following steps:
   (a) in a stage of generating modified data:
      (1) and in a substage of creating data, using a generation piece of software to establish original data associated with the user piece of software;
      (2) and in a modification substage, using a generation secret and at least a portion of the associated original data to determine modified data;
   (b) in a stage of distribution, distributing the user piece of software and the associated modified data to a user; and
   (c) in a stage of using the user piece of software together with the associated modified data on a user system, and in a substage of reconstituting the original data;
      (1) for a user possessing a reconstitution unit including a reconstitution secret:
         (i) subdividing the modified data into at least a first portion, a second portion and a third portion;

(ii) using at least the first portion and the third portion of the modified data to determine an input parameter;
(iii) transferring the input parameter from the user system to the reconstitution unit;
(iv) enabling the reconstitution unit to determine at least one output parameter on the basis of the reconstitution secret and the input parameter;
(v) transferring the output parameter from the reconstitution unit to the user system; and
(vi) running at least one reconstitution function making use of at least a portion of the output parameter, the first portion and the second portion of the modified data to obtain the original data; and (2) for a user not possessing the reconstitution unit, allowing the user piece of software to be used at best with the modified data.

4. A method according to claims 2 or 3, further comprising the steps of:
(a) selecting as the input parameter an intermediate input parameter defined by the user system from an intermediate translation function using a portion of the modified data; and
(b) determining the output parameter from the reconstitution secret and the input parameter as constituted by the intermediate input parameter and optionally the third portion of the data.

5. A method according to claims 1, 2 or 3, further comprising the step of determining the modified data from a generation secret contained in a generation processing and memorizing unit.

6. A method according to claims 1, 2 or 3, further comprising the step of determining the modified data from a generation secret associated with a generation piece of software.

7. A method according to claims 2 or 3, further comprising the steps of repeating the following operations n times, where $n \geq 1$:
(a) subdividing previously obtained data at least into first and second portions;
(b) determining at least one output parameter on the basis of a function of a portion of the data and of one or more user secrets different from or identical to the previously used secret(s); (c) modifying at least one of the other portions of the data by means of a translation function identical to or different from the function used previously; and
(d) reconstituting the data after each stage of processing the data.

8. A method according to claim 7, wherein in the substage of reconstituting the original data, further comprising the steps of:
(a) in a first processing step:
(1) subdividing the modified data into at least a first portion and a second portion;
(2) using at least part of the second portion as the input parameter for the reconstitution unit in order to recover the first portion of the original data; and
(3) making up intermediate data comprising at least the first portion of the original data and the modified second portion of the data; and
(b) in a second processing step:
(1) using at least part of the first portion of the data as an input parameter for the reconstitution unit in order to recover the second portion of the original data; and
(2) reconstituting the original data from the first portion and the second portion of the data.

9. A method according to claim 7, further comprising the steps of performing the operations of translating the original data to obtain modified data n times, wherein $n \geq 1$, said operations being performed in the reverse order to the operations for translating the modified data into original data.

10. A method according to claims 1, 2 or 3, further comprising the step of writing modified data onto a data storage medium associated with the user system to enable the modified data to be used during a stage of running the user piece of software.

11. A method according to claim 8, further comprising the step of performing the operations of translating the original data to obtain modified data n times, wherein $n \geq 1$, said operations being performed in the reverse order to the operations for translating the modified data into original data.

* * * * *